Figure 1:
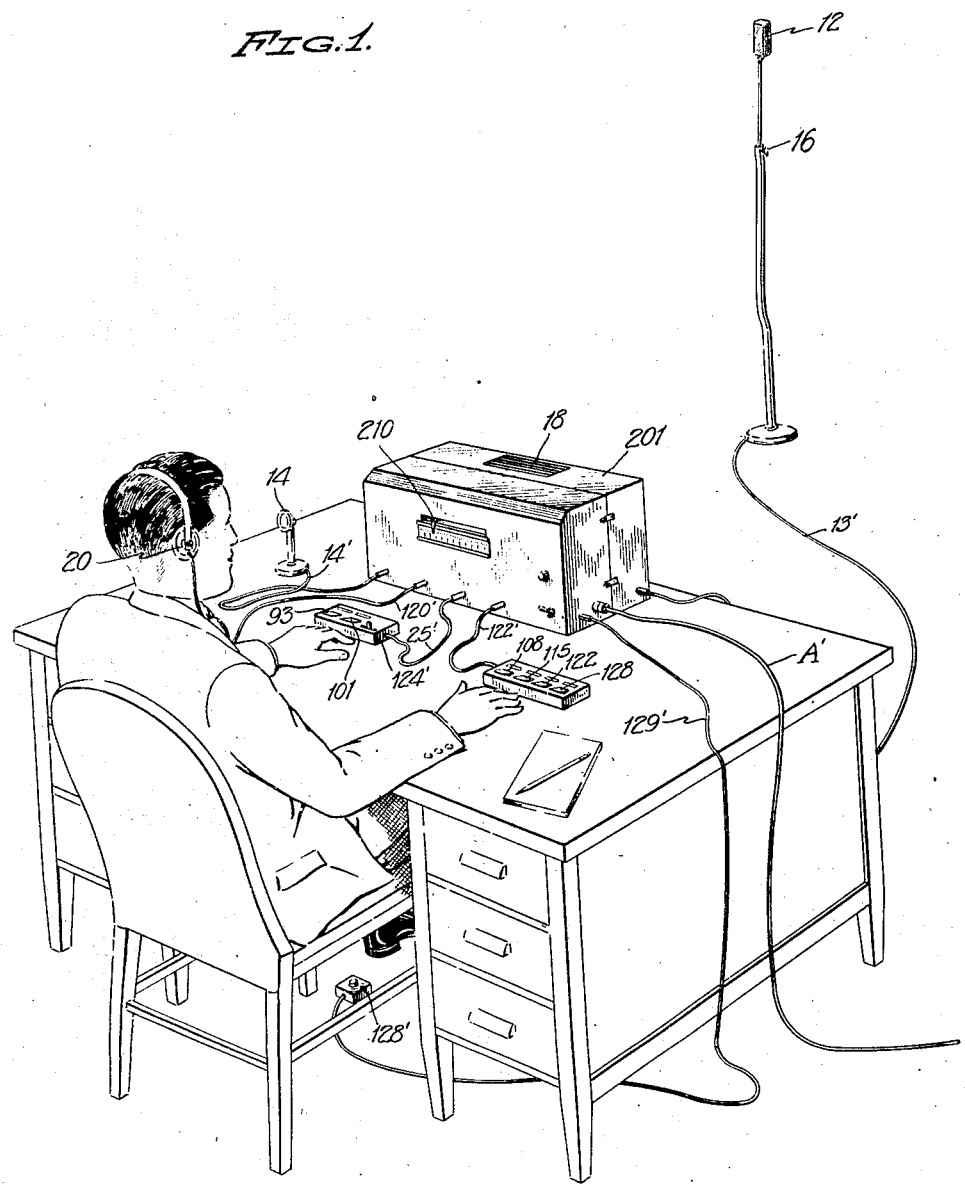

Sept. 21, 1943.　　　W. H. MEINCKE　　　2,330,135

RECORDING APPARATUS

Filed May 8, 1942　　　2 Sheets-Sheet 1

INVENTOR.
WILLIAM H. MEINCKE

Patented Sept. 21, 1943

2,330,135

UNITED STATES PATENT OFFICE 2,330,135

RECORDING APPARATUS

William H. Meincke, White Plains, N. Y.

Application May 8, 1942, Serial No. 442,219

6 Claims. (Cl. 274—11)

The present invention relates to recording devices and more particularly it pertains to a device for recording proceedings of various types such as, reporting court proceedings, conventions or other proceedings of which it is desired to make a permanent record which may also be transcribed.

While the device of the present invention has many adaptations, it particularly lends itself to the reporting of court proceedings and the invention will be described in its adaptation to such work.

At present, it is the general procedure of court reporters to make stenographic notes during a trial, or other proceedings, and subsequently transcribe these notes in spoken form into a recording apparatus which impresses the spoken voice upon a sound recording cylinder or the like. The record is then placed in a suitable reproducing machine under the control of a typist who makes a typewritten copy or copies of the material reproduced from the sound record.

The above outlined procedure is time consuming in that it requires that the reporter read and transcribe his stenographic notes to make the sound record for the use of the typist.

It has another disadvantage in that the record made by either the reporter or the typist gives no indication as to the character of a witness or the manner in which his testimony was presented.

While the present method of procedure is fundamentally accurate it is a well known fact that the same material if reported by a number of reporters, in accordance with the present procedure, each reporter's finished copy will differ in minor respects at least from those of the other reporter's copies and that, therefore, none of the copies gives the material exactly as it was rendered.

The present invention has as its primary object, the elimination of all of the disadvantages of the present methods of procedure employed in the reporting and the making of records of procedures in which many different persons are involved.

One important feature of the present invention resides in the provision of a novel apparatus which will make a permanent and accurate record of the proceedings, since it records the proceedings as they take place and in addition, the manner in which they were rendered. Thus, in the case of a witness, the exact words spoken as well as the manner in which they were spoken, is recorded and may be accurately reproduced.

Another important feature of the invention resides in the provision of a novel apparatus which eliminates the necessity of the reporter reading back his notes to make a record for the typist.

Still another feature of the invention resides in a novel apparatus whereby the spoken voices of a number of persons may be recorded and subsequently identified in the reproduced rendition thereof.

Still a further feature of the invention resides in the provision of a novel apparatus by means of which the recorded material may also be reproduced thus providing for reviewing of any recorded portions of the proceedings even while they are in progress of recording.

The apparatus herein described is particularly intended for use in connection with a reproducing apparatus, which forms the subject matter of a separate application, by means of which a typist may transcribe the recorded material into typewritten form. However, it is to be understood that the apparatus of this application may also be employed independently of any separate reproducing apparatus by operation of its speaker unit in a manner to be hereinafter described.

In the accompanying drawings, I have illustrated one form of apparatus by which the objects of the invention may be accomplished, but it is to be understood that the apparatus herein employed is merely illustrative and that individual mechanisms thereof may be varied without departing from the spirit and scope of the appended claims.

Figure 3:
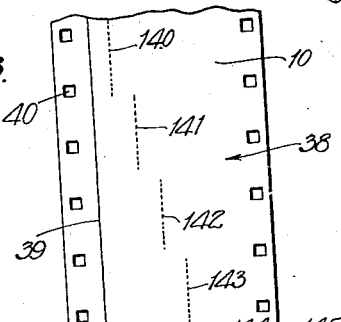

In the accompanying drawings:

Figure 1 is a perspective view illustrating the general external appearance of an apparatus embodying the present invention and illustrating its manner of use, Figure 2 is a diagrammatic view illustrating an apparatus constructed in accordance with the present invention and Figure 3 is a fragmentary plan view of a section of a record strip employed in connection with said apparatus.

Referring to the drawings by reference character and particularly to Figure 2, A designates the positive leg of a suitable source of electric current supply, the negative leg thereof being designated by the reference character B.

The reference numeral 12 designates a microphone which is preferably of the portable type and which is electrically connected with the amplifying unit C by means of conductors 13. A second microphone 14 is electrically connected with the amplifying unit C by conductors 15 in one of which conductors there is a switch 16 by means of which the microphone 14 may be rendered operative and inoperative at will.

strip 38 by means of a spring 60 in which direction its movement is limited both by its engagement with the adjacent end of the bar 55 and engagement of the armature arm 58 with a stop 61.

The electro-magnet 49 is energized to move the stylus of the sound recording and reproducing unit into recording engagement with the record strip 38 when the lever 25 of the switch 24 is in the operation position in the following manner.

Connected as at 62 to the conductor 10, and leading to the electro-magnet 49, there is a conductor 63 and leading from the electro-magnet 49 and connected as at 64 to the conductor 35, there is a short conductor 65.

Thus, when the switch lever 25 is in the operating position current passes from the conductor 10 through conductor 63, electro-magnet 49, conductors 65, and 35, switch contact 30, switch lever contact 32, switch contact 28 and conductor 36.

From the foregoing it will be apparent then that when the switch lever 25 is in its off position, none of the circuits heretofore described will be closed and when the switch lever is moved to the operating or on position, the amplifying unit C will be energized, the record strip feeding mechanism will be driven by the motor 41 and the sound recording and reproducing unit D will be operated to move its stylus into recording engagement with the record strip 38, setting these several parts of the apparatus into operation to record upon the record strip 38 such sounds as may be delivered to either the microphone 12 or the microphone 14.

Under certain operating conditions it may be desirable to read back portions of the recorded copy and the manner in which this may be accomplished will now be described.

The reference character 70 designates a switch which will hereinafter be referred to as the repeat switch.

The repeat switch has three contact points 71, 72 and 73 and a switch lever 74, which in its off position, engages neither of the contacts 71, 72 or 73 and which in its on position engages all of said contacts. In the drawings, this switch lever is illustrated in its off position.

In reading back a portion of the recorded copy, obviously the record strip must be rewound and this is accomplished by the rewind motor 75.

Branching off from a point 76 upon the conductor 63 there is a conductor 77 which leads to the rewind motor 75 and leading from this motor, there is a conductor 78 which leads to the contact point 26 of the switch 24.

The switch lever 74 of the repeat switch 70 is connected to the contact 27 of the switch 24 by a conductor 79. Leading from the contact 72 of the repeat switch 70 to the electro-magnet 50 there is a conductor 80 and leading from the electro-magnet 50 there is a conductor 81 which is connected to the conductor 10 as at 82. The reference character 83 designates a conductor which bridges the switch 24 and which is connected at one end as at 84 to the conductor 79 and at its other end as at 85 to the conductor 36.

To set the device into operation for repeating or repeating a portion of the recorded copy, the switch lever 25 is first moved in the direction of the arrow Z to position its contact 31 in engagement with the contacts 26 and 27 of the switch 24, and subsequently moving the lever 74 of the repeat switch 70 to the on position in which position it engages the contacts 71, 72 and 73 of said switch.

With the several parts in this last described position, the circuit to the rewind motor to set the same into operation, will be as follows: from the conductor 10, through conductors 63 and 77, rewind motor 75, conductor 78, contact 26 of the switch 24, contact 31 of the switch lever 25, contact 27 of switch 24, conductor 79, bridge conductor 83, and conductor 36, thus energizing the rewind motor 75 and setting the same in operation to rewind the record strip 38, it being understood that the rewind motor is operatively connected to the record strip feeding mechanism in a manner to operate same in the reverse direction.

It will be noted that the conductor 79 heretofore mentioned leads from the contact point 27 of the switch 24 to the switch lever 74 of the repeat switch 70, to which it is connected as at 90. Thus, if the repeat switch 70 be moved to the on position, a circuit is completed through the electro-magnet 50 by means of conductors 80, 81, contact 72 of the repeat switch 70, repeat switch lever 74, conductor 79, bridge conductor 83, and conductor 36. Thereupon, the electro-magnet 50 is energized to move the recording and reproducing element D into reproducing engagement with the record strip 38. If now the switch lever 25 be moved to the operating position, the circuit of the rewind motor 75 will be opened while the circuit of the motor 41 will be closed and the record strip 38 will be fed in the forward direction, thereby permitting the sound recording and reproducing unit to reproduce the sound record impressed upon the record strip 38.

The switch 23 of the amplifying unit C has two positions in one of which it is illustrated in dotted lines, it being illustrated in full lines in the other position.

When in the dotted line position, this switch closes the circuits to the two microphones 12 and 14 and the head set 20 and when in the full line position, it opens the circuits to the microphones 12 and 14 and closes the circuits to the speaker unit 18. It will also be noted that the circuit of the microphone 14 includes a switch 16 by which it may be individually cut into and out of operation.

Means is also provided by which the voices of several different persons may be recorded upon the record strip and identified with the individual after the record has been completed.

This last mentioned means comprises a plurality of punching or perforating elements which perforate the record strip 38 at fixed locations together with means for selectively setting them into and out of perforating relation to the record strip.

In the drawings, there are shown six of these perforating elements which are designated $P^1$, $P^2$, $P^3$, $P^4$, $P^5$ and $P^6$. These perforating elements may be so arranged as to be moved into perforating relation with the record strip 38 by means of an electro-magnet 91, of which there is one for each of the perforating elements.

The electro-magnet 91 of the perforating element $P^1$ is connected to the switch lever 92 of a switch 93 by means of a conductor 94 and leading from this electro-magnet there is a conductor 95 which is connected as at 96 to the conductor 43. Leading from the contact point 97 of the switch 93 there is a conductor 98 which is connected as at 99 to the conductor 35.

The electro-magnet 91 of the perforating element P² is connected to the switch lever 100 of a switch 101 by a conductor 102 and to the conductor 95 as at 103 by a conductor 104. The contact 105 of the switch 101 is connected to the conductor 98 by a conductor 106.

The electro-magnet 91 of the perforating element P³ is connected to the switch lever 107 of a switch 108 by a conductor 109 and to the conductor 95 as at 110 by a conductor 111. The contact 112 of the switch 108 is connected to the conductor 98 by a conductor 113.

The electro-magnet 91 of the perforating element P⁴ is connected to the switch lever 114 of a switch 115 by a conductor 116 and to the conductor 95 as at 117 by a conductor 118. The contact 119 of the switch 115 is connected to the conductor 98 by a conductor 120.

The electro-magnet 91 of the perforating element P⁵ is connected to the switch lever 121 of a switch 122 by a conductor 116 and to the conductor 95 as at 123 by a conductor 124. The contact 125 of the switch 122 is connected to the conductor 98 by a conductor 126.

The electro-magnet 91 of the perforating element P⁶ is connected to the switch lever 127 of a switch 128 by a conductor 129 and the conductor 43 heretofore mentioned forms the other leg of the circuit for this particular magnet. The contact 130 of the switch 128 is connected to the conductor 98 by a conductor 131.

From the foregoing it will be apparent that upon operation of any of the switches 93, 101, 108, 115, 122, 128 its corresponding electromagnet 91 will be energized thus providing for selectively moving the perforating elements into perforating relation to the record strip 38.

The operating members of the several switches 93, 101, 108, 115 and 122 are preferably in the form of depressable buttons or keys by which the switch levers of the several switches may be operated by hand. The operating member of the switch 128, however, is preferably operated by a foot pedal or the like 128'.

In the operation of the apparatus, the several persons whose spoken voices will at times be recorded upon the record strip 38, will be individually identified with the keys which operate the switches 93, 101, 108, 115, 122 and 128 in order that their respective records impressed upon the sound track of the record strip may be subsequently identified.

For example, in reporting a court proceeding the key of the switch 93 would be identified as the judge's key, the key of the switch 101 would be identified as defendant's counsel, the key of the switch 108 would be plaintiff's counsel. The remaining switches 115 and 122 are merely auxiliary switches to be employed as and when occasion may arise.

It is to be understood that the foregoing designations for the operating keys of the switches 93, 101, 108, 115 and 122 are purely arbitrary and that other designations therefor depending upon the use to which the apparatus is put, may be employed.

In the operative apparatus the keys which operate the switches 93, 101, 108, 115 and 122 may be grouped in any desired arrangement and the switch 25 will be closely associated therewith.

One convenient arrangement would be separation of the keys of the two switches 93 and 101 and the switch 25 in one group for operation by the left hand of the operator, the switches 108, 115, and 122 being grouped for operation by the right hand of the operator with the switch 128 arranged for operation by the foot of the operator.

Such an arrangement is illustrated in Figure 1 of the drawings in which figure 201 designates a cabinet within which are mounted the record strip driving motors, the record strip feeding mechanism, the sound recording element, the perforating mechanisms and the speaking unit. The cabinet may also include a suitable indicating means 210 by means of which the recorded and the unrecorded portions of the record strip may be determined.

The conductors of the microphone 12 are in the form of a cable 13' which plugs into the cabinet; the conductors of the switches 24, 93 and 108 being in the form of a cable 25' which plugs into the cabinet and leads from a block 24' upon which these switches may be mounted; the conductors of the switches 108, 115 and 122 being in the form of a cable 122' which plugs into the cabinet and leads from a block 125' upon which these switches may be mounted; the conductors of the foot operated switch are in the form of a cable 129' which plugs into the cabinet and leads from the foot pedal 128'; the conductors of the head phone 20 are in the form of a cable 120' which plugs into the cabinet and leads from the head phone 20; the conductors of the microphone 14 being in the form of a cable 14' which plugs into the cabinet and leads from the said microphone and the main supply is in the form of a cable A' which is connected to any suitable source of electric current supply and which may also plug into the cabinet. Associated with each of the switches 93, 101, 108 and 122 there is an indicating means 129' by which the identifications of the particular switches may be indicated, the means being preferably in the form of a card removably held in guides.

Referring to the Figure 3 in which the record strip is illustrated in plan, it will be noted that the portion thereof between the sound track 39 and the traction perforations at the opposite side edge thereof has six sets of perforations designated 140, 141, 142, 143, 144 and 145.

These perforations were formed respectively by the perforating elements P¹, P², P³, P⁴, P⁵ and P⁶ and as illustrated in said figure they extend longitudinally of the record strip in spaced relation to one another.

In Figure 2 of the drawings, the apparatus is illustrated in full lines in its neutral or inoperative position and one manner in which the apparatus may be employed will now be described, the description being confined to the reporting of a court procedure.

With apparatus in the position illustrated, in Figure 1 of the drawings, the operator moves the switch lever 25 of the switch 24 to the left in the direction of the arrow Y in Figure 1, moving the contact 32 thereof into engagement with the switch contacts 28, 29 and 30.

In this position of the apparatus, the motor 41, the microphone 12, the head set 20 and the electro-magnet 49 will all be energized in the manner heretofore described and the motor will start to operate the record strip feeding mechanism and the stylus of the combined sound recording and reproducing unit will be moved into recording relation with the record strip.

The operator, in using the present machine, will replace the court stenographer.

With the switch lever 25 in the position described and with the record strip in motion, the operator closes the switch 16 of the microphone 14 into which the operator may talk to record the heading or title of the proceedings and the necessary preliminary information relative thereto. Before talking into the microphone 14, however, the operator depresses his particular key to move its corresponding perforating element into perforating engagement with the record strip 38 by energization of its corresponding electromagnet 91.

So long as the operator maintains these several circuits closed, he may talk into the microphone 14 and the sound impression and the perforations will be impressed upon the record strip, the latter being in that location upon the strip which will indicate that the sound record was made by the operator.

After the necessary preliminary data has been recorded upon the record strip, the operator removes his hand from the operating lever of his respective switch and moves the switch lever 25 of the switch 24 to its neutral position, awaiting continuation of the proceedings.

In the ordinary course of events, the plaintiff's attorney would open the case with his remarks and at the beginning thereof the operator would again move the switch lever 25 to the position heretofore described and open the switch 16 of the circuit of the microphone 14.

With the parts in this position, the microphone 12 is energized in order that the spoken words of the plaintiff's attorney may be recorded upon the record strip, it being understood that the operator would, before the plaintiff's attorney started to speak, depress the operating member of the switch assigned to him. When the plaintiff's attorney finishes talking, the operating member of his switch is released and the switch lever 25 of the switch 24 may or may not be moved to the neutral position.

At the same time that the plaintiff's attorney's sound record is being impressed upon the record strip, the depression of the switch lever of the plaintiff's attorney's switch will close the circuit to its respective electro-magnet 91 and position its corresponding perforating element into perforating engagement with the record strip in order that the perforation may be made in the proper position upon the record strip to indicate that that portion of the sound track recorded thereon was spoken by the plaintiff's attorney.

From the foregoing it will be obvious that if each of the participating parties be assigned one of the switches 93, 101, 108, 115 or 122 the operator can, by selective operation of these switches, impress the proper perforated record upon the record strip to identify any section of the sound track impressed thereon, and this is accomplished by selective depression of the operating members of the switch levers of said several switches.

In reporting court procedure, the witness would preferably not be assigned one of the switches 93, 101, 108, 115, 122, since the recording of his testimony would be provided for by the operation of the switch 25 to start and stop the motor 41. Also in the transcribing of court procedure notes, general discussions and the like are indicated by indentation of the margin in the typewritten copy and this condition may be taken care of preferably by a foot operating means such as designated 128' in the drawings.

The foot operating means preferably operates the switch 128 to in turn operate its corresponding perforating device, P$^b$ to produce upon the record strip a series of perforations to indicate indentation of the corresponding sound record on the record strip.

While in the present embodiment of the invention, the apparatus has been illustrated as of the type which continually drives the record strip when the switch lever 25 of the switch 24 is in the operating position, it is to be understood that the record strip may be driven in an intermittent manner merely by the introduction of the electric clutch between the motor 41 and the record strip feeding mechanism.

With the device it will be possible to read back a portion of the sound track, for example, a portion of the plaintiff's attorney's opening remarks. The switch lever 25 of the switch 24, will be moved to the right in Figure 1 of the drawings in the direction of the arrow Z, to move its contact 31 into engagement with the contacts 26 and 27. The switch lever 74 of the repeat switch 70 is also moved into engagement with the contacts 71, 72 and 73 of the repeat switch. This position of the parts opens the circuit to the motor 41 and closes the circuit to the rewind motor 75 driving the record strip feeding mechanism in the proper direction to rewind the record strip to a desired point.

Having thus described the invention, what is claimed as new is:

1. In a recording apparatus in combination, a record strip, means for feeding the record strip, means for controlling the operation of the record strip feeding means, sound recording means for impressing a plurality of separate sound records upon the record strip, means controlled by the controlling means of the record strip feeding means for moving the sound recording means into and out of operative relation with the record strip simultaneously with the respective starting and stopping of its feeding means by the controlling means thereof, and means for impressing identifications of the separate sound recordings upon the record strip, said means comprising a plurality of perforating devices movable into and out of perforating engagement with the record strip, and means for selectively controlling the movement of the perforating devices into operative engagement with the record strip.

2. In a recording apparatus in combination, a record strip, means for feeding the record strip, means for controlling the operation of the record strip feeding means, sound recording means for impressing a plurality of separate sound records upon the record strip, means controlled by the controlling means of the record strip feeding means for moving the sound recording means into and out of operative relation with the record strip simultaneously with the respective starting and stopping of its feeding means by the controlling means thereof, and means for impressing identifications of the separate sound recordings upon the record strip, said means comprising a plurality of perforating devices normally inoperative with respect to the record strip and means for selectively moving said perforating devices into operative relation with the record strip.

3. In a recording apparatus in combination, a record strip, means for feeding the record strip, means for controlling the operation of the record strip feeding means, a sound recording and reproducing element, means controlled by the controlling means of the record strip feeding means for moving the sound recording and reproducing element into and out of recording engagement with the record strip simultaneously with the respective starting and stopping of its feeding means by the controlling means thereof, separate means for moving the sound reproducing and recording element into and out of reproducing engagement with the record strip, and means for impressing identifications of the separate sound recordings upon the record strip, said means comprising a plurality of perforating devices movable into and out of perforating engagement with the record strip, and means for selectively controlling the movement of the perforating devices into operative engagement with the record strip.

4. In a recording apparatus in combination, a record strip, means for feeding the record strip in one direction to impress a sound recording upon the record strip or to reproduce a sound recording previously impressed thereon, separate means for feeding the record strip in the opposite direction to rewind a portion thereof, means for controlling the means for feeding the record strip in the feeding and reproducing direction, separate means for feeding the record strip in the rewind direction, means for controlling the operation of said record strip feeding means in the rewinding direction, means for moving the sound recording and reproducing element into recording engagement with the record strip, separate means for moving the sound recording and reproducing element into reproducing engagement with the record strip, and separate means for controlling the operation of said sound recording and reproducing unit operating means.

5. In a recording apparatus in combination, a record strip, a feeding mechanism for feeding the record strip in both forward and rewind directions, an electric motor for operating the feeding mechanism, two separate electric circuits for driving said motor to drive the feeding mechanism in the record strip feeding direction, separate means including switches for individually controlling said circuits, a combined sound recording and reproducing element for recording and reproducing engagement with the record strip, means operated by the control switch of one of said circuits for moving the sound recording and reproducing element into recording engagement with the record strip, means operated by the control switch of the other of said electric circuits for moving the sound recording and reproducing element into reproducing engagement with the record strip, and a separate motor for operating the record strip feeding means in the rewind direction.

6. In a recording apparatus in combination, a record strip, a feeding mechanism for feeding the record strip in both forward and rewind directions, an electric motor for operating the feeding mechanism, two separate electric circuits for driving said motor to drive the feeding mechanism in the record strip feeding direction, separate means including switches for individually controlling said circuits, a combined sound recording and reproducing element for recording and reproducing engagement with the record strip, means operated by the control switch of one of said circuits for moving the sound recording and reproducing element into recording engagement with the record strip, means operated by the control switch of the other of said electric circuits for moving the sound recording and reproducing element into reproducing engagement with the record strip, a separate motor for operating the record strip feeding means in the rewind direction, and a circuit for said second mentioned motor, said circuit including the control switch of the first mentioned circuit of the first mentioned motor.

WILLIAM H. MEINCKE.

Sept. 21, 1943. R. M. NARDONE 2,330,136
ENGINE STARTING MECHANISM
Filed Nov. 17, 1941
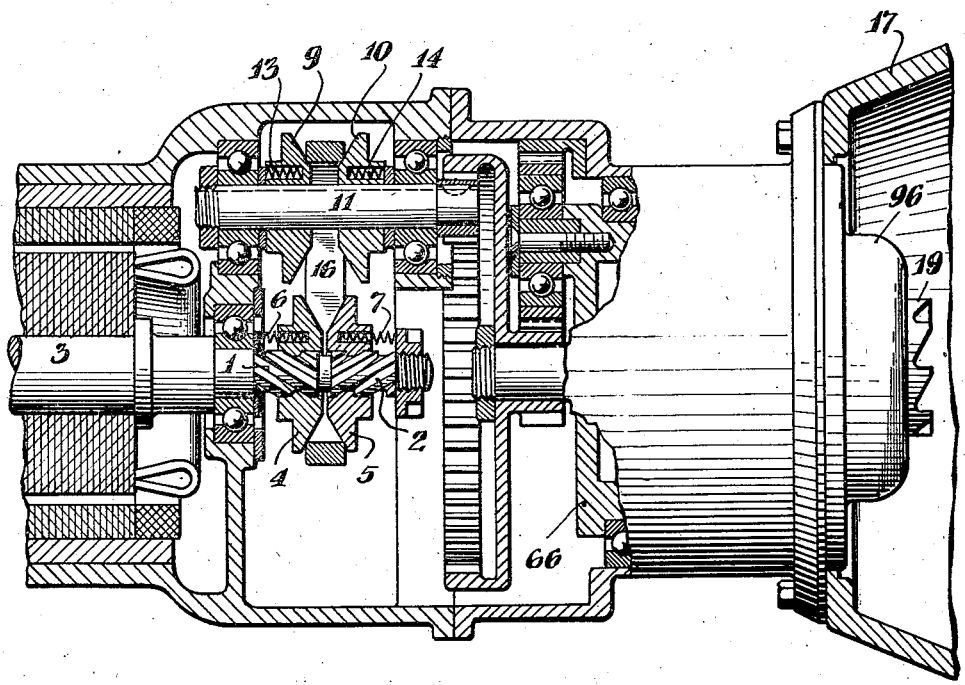
INVENTOR.
Romeo M. Nardone
BY Martin J. Finnegan
ATTORNEY